United States Patent [19]
Luchaco et al.

[11] Patent Number: 4,954,768
[45] Date of Patent: Sep. 4, 1990

[54] TWO WIRE LOW VOLTAGE DIMMER

[75] Inventors: David G. Luchaco, Macungie, Pa.; Charles C. Houng, Clinton, N.J.

[73] Assignee: Lutron Electronics Co., Inc., Cooperburg, Pa.

[21] Appl. No.: 358,329

[22] Filed: May 26, 1989

Related U.S. Application Data

[60] Division of Ser. No. 122,588, Nov. 17, 1987, Pat. No. 4,876,498, which is a continuation of Ser. No. 839,304, Mar. 13, 1986, abandoned.

[51] Int. Cl.$^5$ .............................................. G05F 5/02
[52] U.S. Cl. .................................... 323/300; 307/632; 307/645; 315/DIG. 4; 323/324; 323/326; 323/905
[58] Field of Search ..................... 307/632, 645, 646; 323/239, 300, 320, 324–327, 905; 315/DIG. 4, 199, 225, 226, 276

[56] References Cited

U.S. PATENT DOCUMENTS

| | | |
|---|---|---|
| 3,436,562 | 4/1969 | Harris . |
| 3,484,623 | 12/1969 | Cain . |
| 3,515,902 | 6/1970 | Howell ............................. 307/252 Q |
| 3,526,790 | 9/1970 | Brookmire . |
| 3,594,591 | 7/1971 | Laupman ............................ 307/305 |
| 3,609,517 | 9/1971 | Tucker ................................ 323/300 |
| 3,872,374 | 3/1975 | Rasmussen .......................... 323/300 |
| 4,703,248 | 10/1987 | Kühnemundt et al. ............... 323/327 |

FOREIGN PATENT DOCUMENTS

| | | |
|---|---|---|
| 2550027 | 2/1985 | France . |
| 95125 | 7/1980 | Japan ................................. 323/300 |
| 206930 | 12/1982 | Japan ................................. 323/324 |
| 1206213 | 9/1970 | United Kingdom ................ 323/324 |
| 1544375 | 4/1979 | United Kingdom . |
| 2040121 | 8/1980 | United Kingdom . |

*Primary Examiner*—William H. Beha, Jr.
*Attorney, Agent, or Firm*—Seidel, Gonda, Lavorgna & Monaco

[57] ABSTRACT

A low voltage two wire dimming circuit comprises a voltage compensating circuit for regulating the RMS value of an AC voltage applied to a load and a correcting circuit for eliminating damaging DC current that may flow through the load. The voltage compensating circuit adjusts the firing angle of an electronic switch disposed in the dimming circuit to compensate for fluctuations in the AC supply voltage. The correcting circuit advances or retards the firing angle during selected half cycles to correct for asymmetries in the AC load voltage waveform caused by excessive DC current. According to the invention, there is also provided a two wire low voltage dimming circuit without voltage compensation but having improved dimming ability at low load currents and improved resistance to the flow of damaging DC currents.

20 Claims, 5 Drawing Sheets

TWO WIRE LOW VOLTAGE DIMMER

RELATION TO OTHER APPLICATIONS

This application is a divisional of patent application Ser. No. 07/122,588, filed Nov. 17, 1987, now U.S. Pat. No. 4,876,498, which in turn is a continuation of patent application Ser. No. 06/839,304, filed Mar. 13, 1986 now abandoned.

BACKGROUND OF THE INVENTION

The present invention relates generally to a dimmer circuit for controlling the RMS value of an AC voltage applied to a load. In particular, the present invention relates to a two wire dimmer circuit for use with reactive loads where damaging DC load current may be present. The present invention embodies correction means for decreasing damaging DC current flowing through the load and voltage compensating means for regulating the RMS value of the AC voltage applied to the load. A two wire low voltage dimming circuit without voltage compensating means but having improved dimming ability at low load currents is also disclosed.

The present invention has particular application to low voltage dimming systems wherein the load is a low voltage transformer. However, the present invention also has application to other types of loads, such as fluorsecent lighting systems.

Two wire dimming circuits are known. One conventional type of two wire dimming circuit comprises a triac and a double phase shift firing circuit operatively connected to the triac's gate terminal. The double phase shift firing circuit employs a series R-C circuit that is coupled across the triac, and a firing capacitor coupled to the R-C circuit by means of a potentiometer and to the gate terminal of the triac by means of a diac. This circuit corrects for damaging DC currents that are known to flow through reactive loads, such as the primary winding of a low voltage transformer, by adjusting the firing angle of the triac in selected half cycles of the waveform of the AC load voltage in the following manner. The DC component appears across the triac and hence also across what is known as the "leading capacitor". The leading capacitor is the capacitor in the before referenced series R-C circuit. Since the leading capacitor is connected to the firing capacitor through the potentiometer, the DC voltage across the leading capacitor is added to the voltage across the firing capacitor and the firing angle is altered to decrease the DC current.

While the aforementioned two wire dimming circuit is capable of solving the DC current problem that is known to exist in reactive loads, it exhibits poor voltage regulation. That is, it is not capable of maintaining the RMS value of the AC voltage applied to the load substantially constant with fluctuations in the AC supply voltage. It is known to modify such a two wire dimmer so that it exhibits good voltage regulation by replacing the leading capacitor with a diac. The modified circuit, however, cannot correct for the DC current problem once the leading capacitor has been removed.

Three wire dimming circuits are also known. In a three wire dimming circuit, two of the wires are connected directly to the AC supply voltage and the firing angle is determined from the voltage across the AC supply. Thus, the firing angle is not affected by DC currents that may flow through the load. It is known to those skilled in the art to incorporate a voltage regulating diac in the three wire dimmer's firing circuit. Such a three wire dimmer exhibits good voltage regulation and does not exhibit the DC current problem. Three wire dimmers, however, are undesirable because three wires (AC hot, AC neutral and load) must be run to each wall box, thus requiring additional installation cost.

The present invention overcomes the failings of the prior art by incorporating both a voltage regulation circuit and a DC current correction circuit in a two wire dimmer.

SUMMARY OF THE INVENTION

A dimming circuit for use with reactive loads, such as a low voltage transformer, comprises only a pair of wires for connection in series with the load and an AC supply voltage. First and second controllably conductive thyristors are operatively coupled to the pair of wires and a control circuit applies control signals to a gate terminal of the first thyristor to fire the first thyristor at a firing angle governed by the instantaneous magnitude of the AC voltage appearing across the control circuit. The second thyristor is rendered conductive only after the load current through the first thyristor exceeds a selected magnitude. The first thyristor is rendered nonconductive after the second thyristor has been rendered conductive. In the preferred embodiment the thyristors used are triacs, but anti parallel connected SCR's or other suitable devices could also be used.

A voltage compensating means is disposed in the circuit for regulating the RMS value of the AC voltage applied to the load. In the disclosed embodiment, the voltage compensating means is a diac having a negative resistance characteristic such that voltage applied to the control circuit by the diac alters the timing of the control signals and hence the firing angle of the triacs when fluctuations in the AC supply voltage occur, thereby maintaining the RMS value of the AC voltage applied to the load substantially constant. This compensating effect occurs as long as the magnitude of the AC supply voltage is greater than the breakover voltage of the diac.

The circuit also embodies correction means for correcting asymmetries in the waveform of the AC load voltage caused by DC current flowing through the load. A DC current flowing through the load may cause advancing or retarding of the firing angle in positive or negative half cycles of the waveform of the AC load voltage, depending upon the magnitude and polarity of the DC current. Thus, the waveform of the AC load voltage becomes asymmetrical. The correction means corrects the asymmetries by advancing or retarding the firing angle in succeeding half cycles until the waveform of the AC load voltage is substantially symmetrical, thereby decreasing damaging DC current flowing through the load.

In the disclosed embodiment, the correction means comprises a series combination of a resistor and correcting capacitor coupled across the dimmer circuit. The correcting capacitor charges to a voltage level that is indicative of the magnitude and polarity of the DC current flowing through the load. A feedback loop adds the voltage across the correcting capacitor to the voltage across a firing capacitor operatively coupled to the first triac's gate. In each succeeding half cycle of the waveform of the AC load voltage, the firing angle is advanced or retarded (with respect to the firing angle in the preceding half cycle of opposite polarity) by an amount governed by the magnitude and polarity of the voltage across the correcting capacitor.

In another embodiment, the correcting capacitor is disposed in series with the voltage compensating diac. The correcting capacitor is charged by the current flowing through the voltage compensating diac to a voltage level indicative of the magnitude and polarity of the DC current flowing through the load. The voltage across the correcting capacitor is applied in series with the diac to effectively adjust the voltage being applied to the firing capacitor, thereby advancing or retarding the firing angle in each succeeding half cycle.

For the purpose of illustrating the invention, there is shown in the drawings a form which is presently preferred; it being understood, however, that this invention is not limited to the precise arrangements and instrumentalities shown.

DETAILED DESCRIPTION OF THE PREFERRED EMBODIMENT OF THE INVENTION

Figure 1:
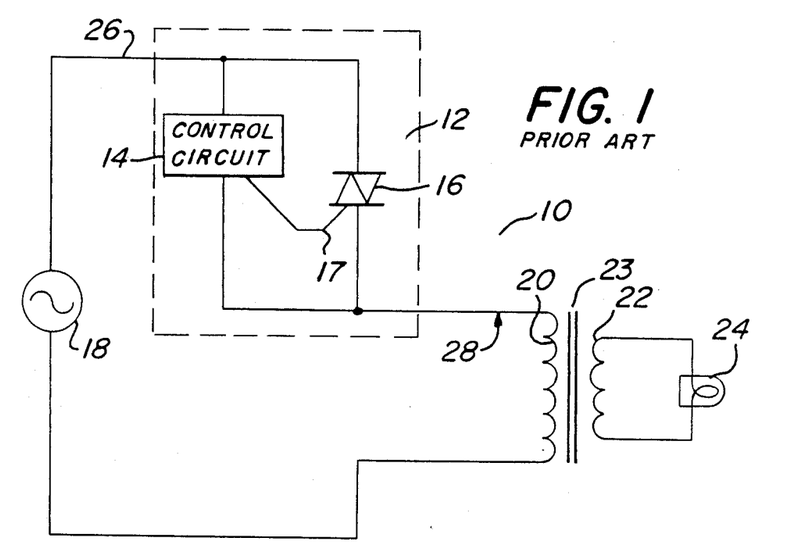
FIG. 1 is a block diagram of a known two wire low voltage dimming circuit.

Referring now to the drawings wherein like numerals represent like elements, there is illustrated in FIG. 1 a block diagram of a conventional two wire low voltage dimming system labeled generally 10. Dimming system 10 comprises a two wire dimming circuit 12 having only a pair of wires 26, 28 connected in series with the primary 20 of a transformer 23 and an AC supply voltage 18. Dimming circuit 12 comprises a triac 16 having a control circuit 14 operatively coupled thereacross for supplying control signals to the gate 17 for selectively rendering the triac 16 conductive. As is well known in the art, the timing of the control signals and hence the firing angle of the triac governs the RMS value of the AC voltage applied to the load. The dimmer circuit 12 illustrated in FIG. 1 is shown as controlling the low voltage applied to a lamp 24 connected across secondary 22.

As is known, the firing angle of triac 16 is governed by the instantaneous voltage across the control circuit 14, and hence across wires 26, 28. Thus, the firing angle may be affected by the DC magnetizing current that flows through the primary 20 of transformer 23. The magnitude of this DC current may become significant and cause problems hereinafter described.

The problematic DC current may be caused by a number of factors. For example, if the lamp 24 or other load connected across the secondary 22 of transformer 23 burns out (i.e., becomes an open circuit), the magnitude of the DC magnetizing current flowing through the primary 20 may become significant compared to the RMS value of the AC current flowing through the primary 20. Additionally, it is conceivable that the supply of AC power to the circuit 10 could be momentarily interrupted at a time when the AC voltage waveform is at or near zero after a positive or negative half cycle. If, at the instant that AC power is restored, the AC voltage waveform is again at or near zero of a half cycle of the same polarity as was present when power was removed, the magnetic material in the core of transformer 23 may saturate and cause the transformer to conduct current in one direction more easily than the other. This delays the firing angle of triac 16 in one half cycle of the AC voltage waveform (see FIG. 9), which causes the transformer 23 to polarize even more. The regenerative nature of the phenomenon results in the DC current problem.

Figure 2:
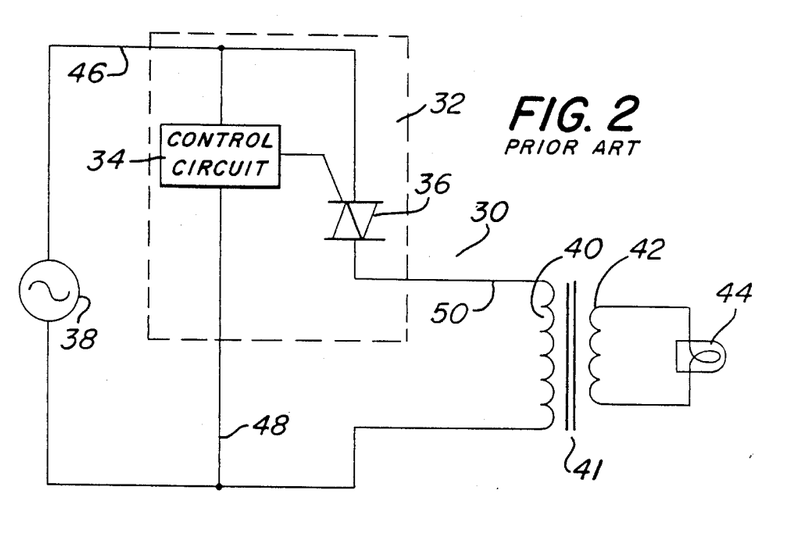
FIG. 2 is a block diagram of a known three wire low voltage dimming circuit.

FIG. 2 illustrates a block diagram of a known three wire low voltage dimming system 30. System 30 comprises a three wire dimmer circuit 32 having two wires 46, 48 coupled directly to the AC supply voltage 38. Wires 48, 50 are coupled to the primary 40 of a transformer 41 for supplying a low voltage to a lamp 44 by means of secondary winding 42. The dimming circuit 32 comprises a triac 36 and a control circuit 34 that supplies control signals to the gate 37 of triac 36. Unlike the control circuit 14 of FIG. 1, control circuit 34 is connected directly across the AC supply voltage. Thus, the firing angle of the control signals is not affected by any DC current that may flow through the primary windings 40 of transformer 41. However, the three wire dimming circuit of FIG. 2 is not only more expensive to manufacture than the two wire dimming circuit of FIG. 1, but three wire dimmers also require that three, rather than two wires be run to a wall box thus increasing the cost associated with the installation of a three wire dimmer.

Figure 6:
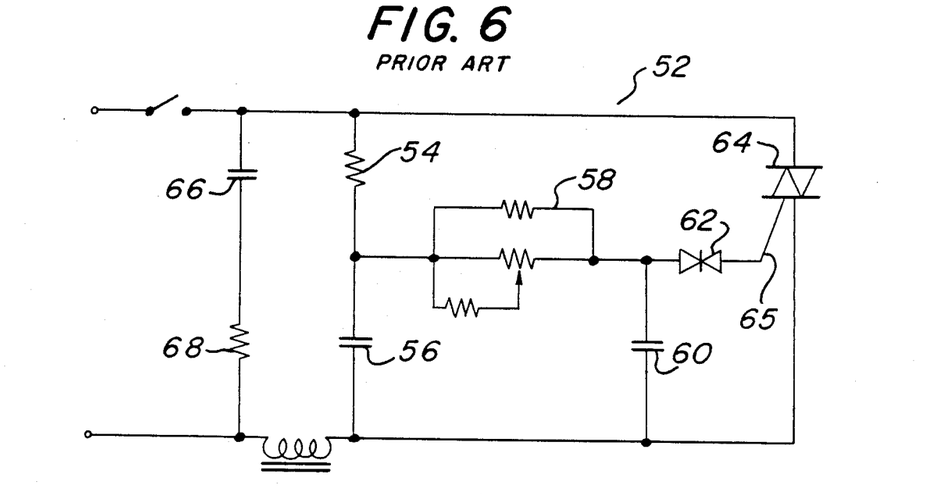
FIG. 6 is a schematic diagram of a prior art two wire dimming circuit.

FIG. 6 schematically illustrates a known two wire dimming circuit 52. The circuit 52 illustrated in FIG. 6 utilizes a type of control circuit for generating control signals known as a double phase shift firing circuit. The double phase shift firing circuit comprises resistor 54, leading capacitor 56, potentiometer/trim circuit 58, firing capacitor 60 and diac 62. The operation of this circuit is well known in the art.

The two wire dimming circuit of FIG. 6 does not exhibit the previously discussed problems caused by DC currents flowing through the load if the characteristics of triac 64 are selected according to certain criteria which will be described later. If a DC component appears across the triac 64, it also appears across the leading capacitor 56. Since the leading capacitor 56 is coupled to the firing capacitor 60 through the potentiometer/trim circuit 58, the DC voltage across the leading capacitor 56 will correct the firing angle of the triac 64 in selected half cycles of the waveform of the AC load voltage. The effect of altering the firing angle in this manner and an explanation of how this corrects the DC current problem will become evident hereinafter.

While proper selection of the characteristics of triac 64 will insure that the circuit of FIG. 6 does not exhibit the DC current problem hereinbefore described, it does have another problem The circuit of FIG. 6 is not capable of maintaining the RMS value of the AC voltage applied to the load substantially constant with fluctuations in the AC supply voltage. Such a voltage regulating feature in a two wire DC compensating dimmer is desirable.

Prior attempts have been made to modify the circuit of FIG. 6 so that it performs the desired voltage regulating function. One such modification involves replacing the leading capacitor 56 with a diac so that the voltage impressed upon the potentiometer/trim circuit 58 during the period that the diac is in conduction varies in such a manner as to modify the firing angle to compensate for variation of the AC supply. This modification results in a two wire dimmer that is voltage regulating as long as the AC voltage does not fluctuate below the diac's breakover voltage. But, the resulting dimmer is not capable of correcting for DC current flowing through the load because the modification necessitates the removal of the leading capacitor 56. The following discussion explains why this is so. In the following discussion, the term "modified circuit" is used to refer to the circuit of FIG. 6 that is modified in the hereinbefore described manner by replacing leading capacitor 56 with a diac.

Figures 7, 8:
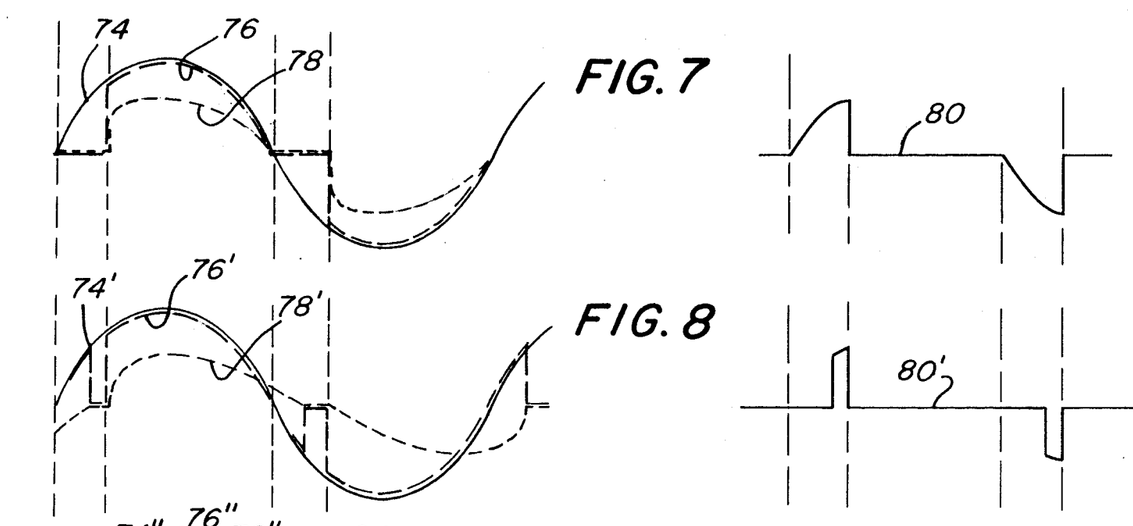
FIGS. 7, 8 and 9 are voltage waveforms illustrated for use in describing the operation of the present invention.
Figure 9:
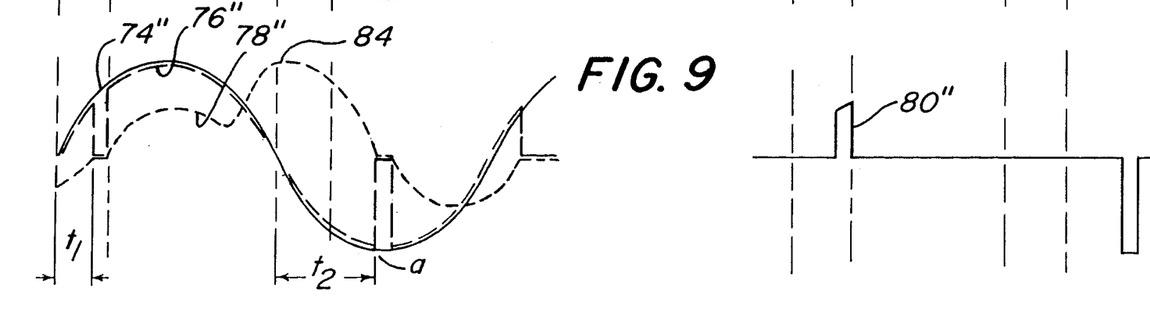

Referring to the waveforms of FIGS. 7, 8 and 9 there are illustrated relationships between AC supply voltage (74, 74', 74''), AC load voltage (76, 76', 76''), AC load current (78, 78', 78'') and AC voltage across the triac (80, 80', 80''). As illustrated in each of the figures, the AC load voltage (76, 76', 76'') is chopped by the triac 64 in well known manner to supply a voltage of a desired RMS value. As is also known in the art, adjustment of the firing angle of triac 64 results in a corresponding adjustment of the RMS value of the AC voltage applied to the load.

FIG. 7 illustrates various waveforms of AC supply voltage 74, AC load voltage 76 and AC load current 78 for a purely resistive load that may be connected to the modified circuit of FIG. 6. As is seen, all of the waveforms are substantially in phase and substantially symmetrical, including the waveform 80 representing the AC voltage across the triac 64. Thus, the operation of the circuit of FIG. 6 when used with a purely resistive load is acceptable.

FIG. 8 illustrates the same waveforms that result when the modified circuit of FIG. 6 is applied to a load that is mostly resistive but has some inductive component. As shown, the inductive component causes the AC current waveform 78' to be slightly shifted out of phase with respect to the AC load voltage waveform 76'. All of the waveforms, however, are symmetrical. Thus, for the case where the inductive component of the load is small, the modified circuit of FIG. 6 is also acceptable.

FIG. 9 illustrates why the modified circuit of FIG. 6 is not acceptable for use in loads having both a resistive component and a substantial inductive component, such as a transformer load. Again, the phase of the AC load current 78'' is sightly out of phase with respect to the waveform 76'' of the AC load voltage. Saturation of the magnetic materials in the load (transformer) may cause the load to conduct current in one direction more easily than in the other, thus causing the AC load current 78'' to increase to an abnormally high level, as shown at 84, during the time period that the AC load voltage 76'' is decreasing. Since the triac 64 is a current sensitive device, it does not become nonconductive until the load voltage 76'' has decreased enough to force the AC load current 78'' below the holding current of the triac and thus render the triac nonconductive as illustrated at "a" in FIG. 9. The net effect, as illustrated in FIG. 9, is that the DC current causes the firing angle of the triac 64 to be shifted substantially during recurring positive or negative half cycles, thus allowing the magnitude of the AC load current to increase to abnormal levels. Since this phenomenon occurs only during recurring positive or negative half cycles, and not over the period of a full cycle (compare $t_1$ to $t_2$ in FIG. 9), the waveform 76'' becomes asymmetrical.

As also illustrated in FIG. 9, the shifting of the firing angle during recurring half cycles causes the AC voltage 80'' across the triac 64 to be greater in one half cycle than in the preceeding half cycle of opposite polarity. Further, the voltage across the triac 64 in the positive half cycle can be seen to be lower than the voltage during the negative half cycle. This means that the voltage applied to the load is higher during positive half cycles than negative half cycles, since the load voltage is equal to the difference between the source and triac voltages, and both half cycles of an AC source have essentially equal RMS voltage values. Since the transformer primary to which the load voltage is applied has a larger positive voltage than it has negative voltage, it saturates in the direction of positive current, which causes the peak current 84 to increase its magnitude still further. Therefore, it can be seen that a small asymmetry in the load voltage can, by its influence on the dimmer conduction periods, give rise to a positive feedback effect which results in a continuous aggravation of what may have been a small initial disturbance until a much greater value of peak current 84 may occur. It will be appreciated that if the peak magnitude 84 of the AC load current 78'' is permitted to increase unchecked, a fuse may blow or a circuit breaker may open or if temperatures rise to a sufficient level, a fire hazard may exist.

The above discussion is for illustrative purposes only and it will be appreciated that the DC current problem, though described as occurring during positive half cycles, could just as well occur during negative half cycles. In any event, if the firing angle can be advanced or retarded, as necessary, during the selected positive or negative half cycles in which the DC current problem exists, the potentially damaging DC current can be eliminated. Stated otherwise, if the waveform of the AC voltage applied to the load can be maintained symmetrical or caused to vary in such a manner as to result in negative feedback instead of the positive feedback described above, the hereinbefore current problem will not occur. A dimming circuit for achieving this function will now be described.

Figure 3:
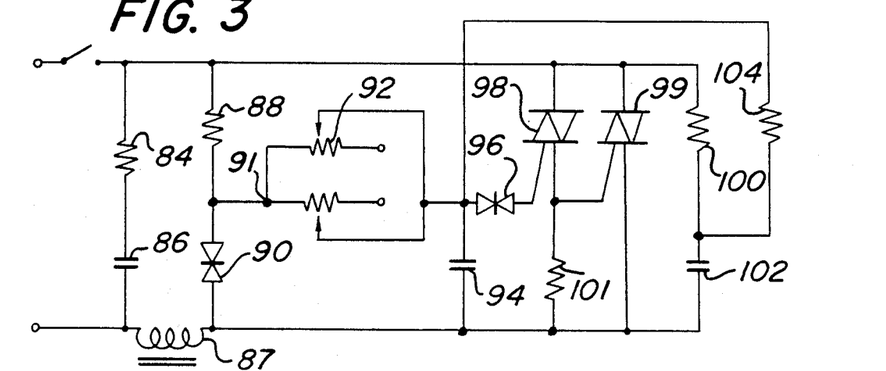
FIG. 3 is a schematic diagram of one embodiment of a two wire low voltage dimming circuit according to the present invention.

Referring to FIG. 3, there is illustrated one embodiment of a dimming circuit according to the present invention. As in FIG. 6, the dimming circuit of FIG. 3 includes a RFI circuit comprising resistor 84, a capacitor 86 and an inductor 87. This RFI circuit does not comprise a part of the present invention. The dimming circuit also includes a control circuit comprising a potentiometer/trim circuit 92, a diac 96 and firing capacitor 94 operatively coupled to the gate terminal of a first triac 98 and to one terminal of potentiometer trim circuit 92. A resistor 101 is in series with the triac 98, and a second triac 99 connected across the dimming circuit has its gate terminal coupled to the junction of the resistor 101 and the first triac 98. The use of two triacs 98, 99, rather than a single triac, improves the operation of the dimmer circuit at low load currents when the triacs are selected in the manner hereinafter described.

The R-C series combination of resistor 88, potentiometer/trim circuit 92 and capacitor 94 provide timed control signals to the gate of triac 98. As is known, the timing of the control signals (and hence the firing angle) is at least partially governed by the setting of the potentiometer in circuit 92. Additionally, the circuit includes a voltage compensating means 90 for maintaining the RMS value of the AC voltage applied to the load substantially constant, and correction means 100, 102 and 104 for correcting asymmetries in the waveform of the AC voltage applied to the load to eliminate the DC current problem previously discussed.

As shown, the voltage compensating means 90 comprises a diac operatively coupled to the control circuit and in particular to the other terminal 91 of potentiometer/trim circuit 92 and to resistor 88. The diac 90 has a breakover voltage that is applied to the control circuit, and in particular to the potentiometer/trim circuit 92, when the diac is in conduction. The control circuit is responsive to the breakover voltage supplied by the diac 90 and to fluctuations in the AC supply voltage to adjust the timing of the control signals and hence the firing angle of the triacs 98 and 99 to maintain the RMS value of the AC voltage applied to the load substantially constant. As in the modified circuit of FIG. 6, this circuit will regulate the AC load voltage as long as the AC supply voltage does not fluctuate below the breakover voltage of diac 90.

In the circuit of FIG. 3, the correction means comprises a series combination of a resistor 100 and a correcting capacitor 102 coupled across the dimming circuit as shown. Correcting capacitor 102 charges to a voltage level indicative of the magnitude and polarity of the DC current flowing through the load. The voltage across correcting capacitor 102 is coupled to the voltage across firing capacitor 94 by means of feedback resistor 104. Thus, the voltage across firing capacitor 94 is altered, thereby altering the firing angle of the triacs 98 and 99 in the next succeeding half cycle. The process of feeding voltage back to the firing capacitor 94 continues for succeeding half cycles of the AC load voltage waveform until the waveform has become substantially symmetrical, i.e., until the DC current has been substantially eliminated.

The dual triac configuration illustrated in FIG. 3 overcomes several problems inherent in single triac type dimming circuits. In single triac type dimming circuits, the triac must be sized for maximum load current and hence has a relatively high holding current. When the load current drops below the holding current, the triac drops out of conduction and power is removed from the load. Thus, no dimming can be performed for load currents that are below the holding current. Moreover, the holding current for forward and reverse directions of current flow through a triac are not the same. This asymmetry may cause serious problems in low voltage dimmers where the load has a substantial inductive component, such as in a low voltage transformer, as it may be sufficient to activate the abovedescribed positive feedback mechanism which is inherent in the operation of known two wire, low voltage dimmer circuits.

In the circuit of FIG. 3, control signals are applied to the gate of the first triac 98, as previously mentioned. Thus, triac 98 becomes conductive when a control signal is applied to its gate and there is sufficient voltage across the triac 98. Triac 99 is rendered conductive when the current through triac 98 and resistor 101 provides a voltage drop across resistor 101 sufficient to fire triac 99. This voltage drop is nominally one volt according to the preferred embodiment. When triac 99 is fully conductive, the voltage between the anode and gate of triac 99 is essentially zero and triac 98 no longer has significant current flowing therethrough. When the current through triac 98 drops below the holding current, triac 98 turns off and triac 99 carries the full load current of the dimming circuit.

If the load current through triac 98 is low enough, the voltage drop across resistor 101 will not be great enough to trigger triac 99 into conduction in the manner described above. In this case, triac 98 will not, as before, be turned off by triac 99, but instead will carry full load current until the load current becomes great enough to trigger triac 99 into conduction.

The advantage of utilizing two triacs, as described above, lies in the ability to select the characteristics of triacs 98 and 99 independently for both low and high ranges of load current. Another advantage lies in the ability to define the boundary between those operating ranges by selecting an appropriate value for resistor 101. The primary factor that determines the characteristics of triac 99 is the maximum load current rating of the dimming circuit, i.e., triac 99 must be able to conduct the maximum load current reliably. Another characteristic that must be chosen is each triac's holding current. Triac holding current varies greatly among different specimens of the same type of triac, and also with temperature and current rating. The following summarizes the considerations that must be taken into account when selecting the triacs for use in the circuit of FIG. 3.

The most problematic operating condition of a two wire low voltage dimmer operating a transformer load occurs when the transformer is unloaded. Under this condition, the current through the conducting triac (typically the triac 98 in FIG. 3) is very low and, for each half cycle of AC load current, may be only slightly greater than the holding current. In such case, when the load current begins to decrease, as it does toward the end of each half cycle, the triac can drop out of conduction before the zero crossing of the AC load voltage. The angle at which the triac drops out of conduction may be significantly different in positive and negative half cycles, due to the beforementioned asymmetry of holding current. The result of this differing conduction, in each half cycle, is that the transformer sees a DC voltage component and may be driven into saturation as a result.

The holding current of a triac is generally on the order of 1/1000 of its maximum current rating. Therefore, a 25 amp rated triac, for example, would be expected to have a holding current of about 25 mA. Even this relatively low holding current can cause serious transformer saturation problems because the peak magnetizing current of a small low voltage transformer may be on the order of only 40 or 50 mA. If one could use a 0.8 amp rated triac, the holding current would be on the order of 0.8 mA, which is relatively insignificant compared to the magnetizing current. However, a 0.8 amp triac cannot sustain the desired full load current or transient surges that are common in dimmer applications.

Referring to FIG. 3, if the value of resistor 101 is chosen at approximately 5 ohms, only triac 98 will conduct if the peak load current is less than about 200 mA, i.e., 200 mA is required to provide a 1 volt drop across a 5 ohm resistor and thereby render triac 99 conductive. Thus, triac 98 can be rated for a relatively low maximum load current, thereby providing a very low holding current, as hereinbefore described. If the load current increases above 200 mA, triac 99 will turn on and triac 98 will turn off, as above described. Triac 99 will handle the full load current, and its relatively higher holding current will be unimportant at these higher load currents.

The above example where triac 98 is rated at 0.8 amps and triac 99 is rated at 25 amps, is a typical ratio. The value chosen for resistor 101 depends on the actual current ratings, but generally should be chosen to give a one volt drop at a current level of about 1/10 to ½ of the maximum current rating of triac 98. This insures that low load currents are conducted only through triac 98 and that only high load currents are conducted through triac 99.

Figure 4:
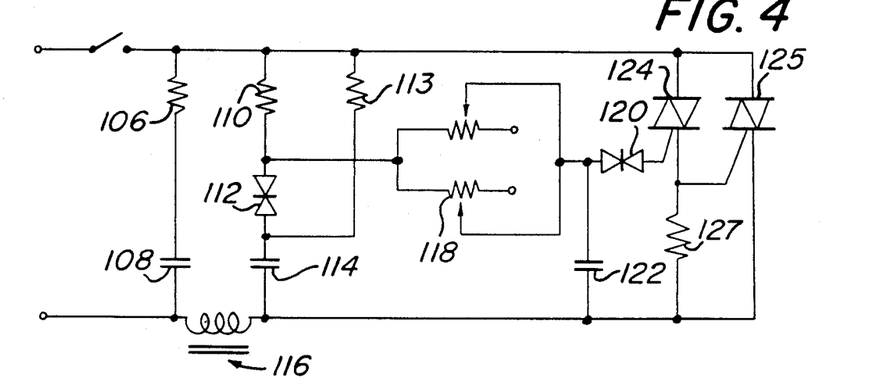
FIG. 4 is a schematic diagram of another embodiment of a two wire low voltage dimming circuit according to the present invention.

FIG. 4 illustrates another circuit embodiment according to the present invention. Again, a RFI circuit comprises a resistor 106, a capacitor 108 and an inductor 116. A control circuit for supplying control signals to the gate terminal of a first triac 124 comprises resistor 110, potentiometer/trim circuit 118, diac 120 and firing capacitor 122. As before, a resistor 127 is in series with a first triac 124. A second triac 125 is connected across the dimming circuit and has its gate terminal coupled to the junction of resistor 127 and triac 124. Triacs 124 and 125 are selected in the same manner as triacs 98 and 99 hereinbefore described.

A diac 112 is coupled to the control circuit, and particularly to the potentiometer/trim circuit 118, as shown. A correcting capacitor 114 is connected between the diac 112 and one side of the dimmer circuit in the manner shown. A resistor 113 couples the other side of the dimmer circuit to the junction of diac 112 and correcting capacitor 114. As before, diac 112 supplies a compensated breakover voltage to the control circuit, and particularly to potentiometer/trim circuit 118 when the diac is in conduction. The control circuit is responsive to fluctuations in the AC supply voltage and to the breakover voltage to adjust the firing angle of the control signals and maintain the RMS value of the AC voltage applied to the load substantially constant. As before, the RMS value of the AC voltage applied to the load will remain substantially constant as long as the AC voltage does not fluctuate below the breakover voltage of the diac. Thus, in the circuit of FIG. 4, diac 112 performs the voltage regulating function.

In the circuit of FIG. 4, the correcting means comprises capacitor 114, resistor 110, diac 112 and resistor 113. The current through resistor 110, diac 112 and resistor 113 charges capacitor 114 to a voltage level that is indicative of the magnitude and polarity of the DC current flowing through the load. The voltage across correcting capacitor 114 is applied in series with the diac 112, thereby effectively adjusting the voltage applied to the firing capacitor 122 through the potentiometer/trim circuit 118. This variation in voltage applied to firing capacitor 122 through potentiometer/triac circuit 118 will correct the firing angle in each succeeding half cycle, thereby removing any asymmetries in the AC voltage waveform and thus substantially eliminating the DC current.

The value of the correcting capacitor 102 utilized in the circuit of FIG. 3, and the value of the capacitor 114 utilized in the circuit of FIG. 4 must be large enough so that there is only a relatively small AC impedance. Preferably, the correcting capacitors 102, 114 should be sized so that they represent a substantial short circuit to AC current. Thus, only a small ripple voltage should appear across the correcting capacitors 102, 114.

Figure 5:
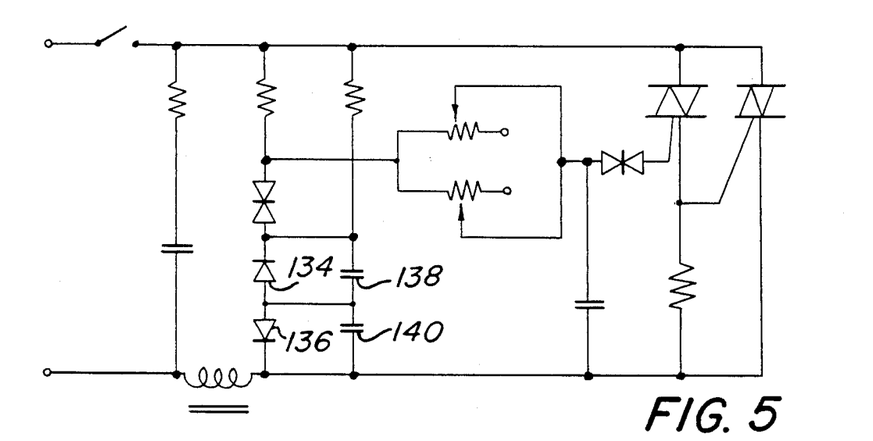
FIG. 5 is a schematic diagram of still another embodiment of a two wire low voltage dimming circuit according to the present invention.

The embodiment of FIG. 5 is substantially identical to the embodiment of FIG. 4, except that the circuit of FIG. 5 utilizes two electrolytic capacitors 138, 140 and two diodes 134, 136 to replace the capacitor 142. This modification minimizes the physical size of the circuit and allows installation in a standard wall box. Again, the previous discussion of how the triacs are selected is applicable.

According to another aspect of the invention, there is provided a two wire low voltage dimming circuit without voltage compensating means but having improved dimming ability at low load currents and improved resistance to the DC current problem hereinbefore described. Such circuit incorporates dual triacs selected according to the criteria previously discussed.

Figure 10:
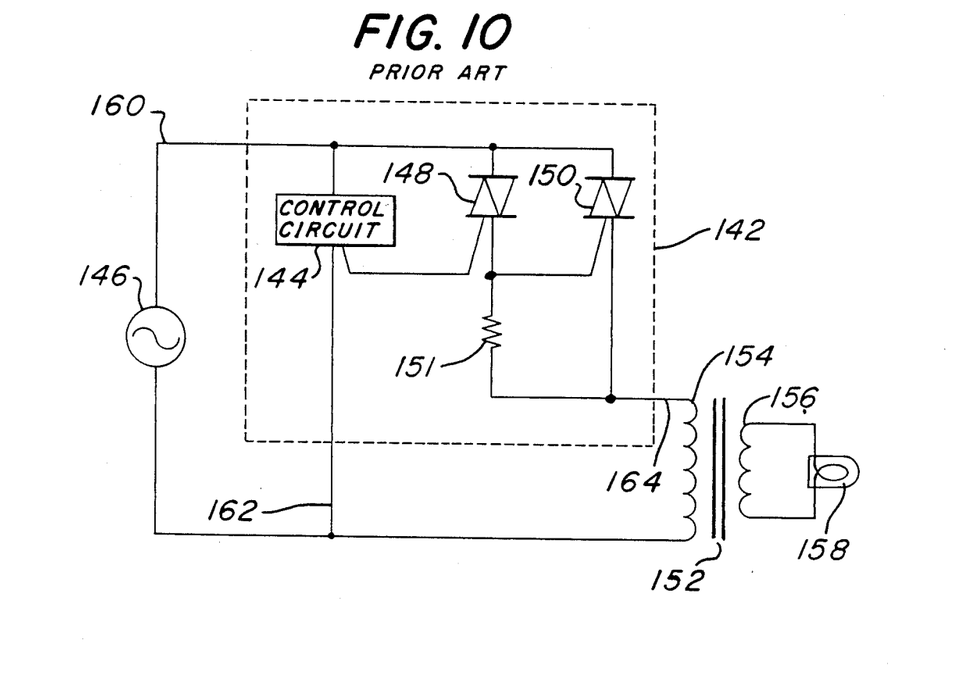
FIG. 10 is a schematic diagram of a known three wire, dual triac dimming circuit.

FIG. 10 illustrates a known three wire dimming circuit having three wires 160, 162, 164 for connection to an AC supply 146 and a load 152. As shown, load 152 is a low voltage transformer comprising a primary 154 and a secondary 156 coupled to an incandescent lamp 158. Circuit 142 comprises dual triacs 148, 150 and a resistor 151 in series with triac 148, as shown. The gate of triac 148 receives control signals from a control circuit 144. The gate of triac 150 is operatively coupled to the junction of resistor 151 and triac 148. It is known, in connection with the construction of the three wire dimmer circuit 142, to select triacs 148, 150 according to the criteria previously discussed. As has been mentioned, however, three wire dimmer circuits of the type illustrated in FIG. 10 are undesirable because three wires must be run to each wall box, thereby increasing installation costs.

Figure 11:
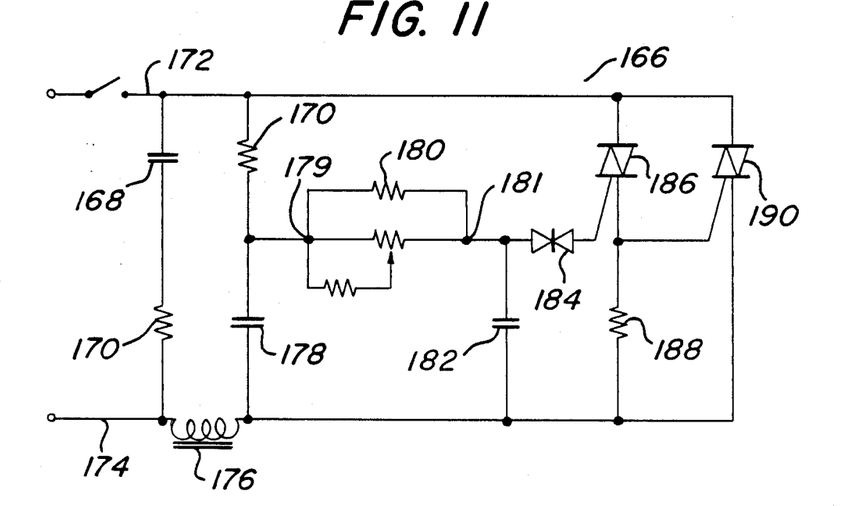
FIG. 11 is a schematic diagram of a two wire, low voltage, dual triac dimming circuit without voltage compensating circuitry according to the present invention.

According to the present invention, there is provided a two wire low voltage dimming circuit utilizing dual triacs selected according to the criteria discussed herein. Such a circuit is illustrated in FIG. 11 and labelled generally 166. Circuit 166 is DC correcting but is not capable of voltage regulation for the same reasons as described in connection with the circuit 52 illustrated in FIG. 6. Circuit 166 comprises only a pair of wires 172, 174 for connection in series with an AC supply and a load. As before, the load may be a low voltage transformer. Also, the circuit 166, with minor modification, may be used as a fluorescent light dimmer and connected in series with a ballast.

As before, circuit 166 includes a RFI filter comprising a capacitor 168, resistor 170 and inductor 176, connected as shown. The RFI filter does not comprise any part of the present invention. Circuit 166 also includes a series R-C circuit combination, i.e., resistor 170 and capacitor 178, operatively coupled across the pair of wires 172, 174 through inductor 176. The junction of resistor 170 and capacitor 178 is operatively coupled to one side 179 of a potentiometer/trim circuit 180. The other side 181 of potentiometer/trim circuit 180 is operatively coupled to a diac 184 in series with the gate of triac 186. A capacitor 182 is operatively coupled across the potentiometer/trim circuit 180 and the junction of capacitor 178 and inductor 176, as shown. Triac 186 is operatively coupled in series with a resistor 188 across the pair of wires 172, 174 through inductor 176. Triac 190 is operatively coupled directly across the pair of wires 172, 174 through inductor 176 as shown and its gate terminal is operatively coupled to the junction of resistor 188 and triac 186. Triacs 186, 190 are preferably selected in the manner hereinbefore described and their operation is also as previously described.

The circuit of FIG. 11 is DC correcting but does not perform voltage regulation. However, the circuit of FIG. 11 exhibits improved dimming ability at low load currents for the reasons previously described. Still further, the dual triacs used in the circuit of FIG. 11 prevent the problems that are normally caused where the load has a substantial inductive component.

The present invention may be embodied in other specific forms without departing from the spirit or essential attributes thereof and, accordingly, reference should be made to the appended claims, rather than to the foregoing specification, as indicating the scope of the invention.

We claim:

1. In a two wire AC dimming circuit of the type having electronic bidirectional switch means with control input means for selectively rendering the electronic switch means conductive according to repetitive timed control signals applied to the control input means to control the RMS value of an AC voltage applied to the load, a circuit for regulating the RMS value of the AC voltage applied to the load and for decreasing damaging DC current caused by loads having both resistive and inductive components comprising:
    (a) first means for providing a signal having a value indicative of a DC current flowing through the load;
    (b) second means responsive to the signal provided by the first means for adjusting the timing of the control signals during selected half cycles of the waveform of the AC voltage applied to the load to decrease the DC current flowing through the load; and
    (c) third means in electrical series with the first means for automatically adjusting the timing of the control signals in response to fluctuations in the AC voltage supplied to the dimmer to thereby regulate the RMS value of the AC voltage applied to the load.

2. Circuit according to claim 1 wherein the first means comprises a first capacitor and means for charging the first capacitor to a DC voltage having a magnitude and polarity indicative of the magnitude and polarity of the DC current flowing through the load.

3. Circuit acccording to claim 2 wherein the electronic switch means comprises thyristor means and the control input means comprises a gate terminal of the thyristor means and the dimmer includes a second capacitor operatively coupled to the gate terminal for supplying the control signals and rendering the thyristor means conductive when the second capacitor has been charged to a predetermined voltage.

4. Circuit according to claim 3 wherein the thyristor means comprises first and second thyristors each having a holding current characteristic, the holding current characteristic of the first thyristor being substantially less than the holding current characteristic of the second thyristor.

5. Circuit according to claim 4 further comprising a resistor connected in series with a main terminal of the first thyristor, the gate of the first thyristor receiving the control signals, the gate of the second thyristor being coupled to a junction of the resistor and the main terminal of the first thyristor, the second thyristor being rendered conductive when a voltage across the resistor exceeds a selected value, the first thyristor being rendered non-conductive after the second thyristor has been rendered conductive.

6. Circuit according to claim 3 wherein the second means comprises a feedback loop for coupling the DC voltage across the first capacitor to the voltage across the second capacitor to vary the voltage across the second capacitor and thereby alter the timing of the control signals.

7. Circuit according to claim 3 wherein the third means comprises a diac operatively coupled to the first capacitor, the diac having a breakover voltage thereacross when in its conductive state, at least a portion of the breakover voltage being applied to the second capacitor.

8. Circuit according to claim 7 wherein the second means comprises means for applying the DC voltage across the first capacitor to the diac to effectively alter the voltage applied to the second capacitor and thereby alter the timing of the control signals.

9. Circuit according to claim 1 wherein the load is a low voltage transformer.

10. Circuit according to claim 1 wherein the load is a ballast.

11. Circuit according to claims 3, 6, 7 or 8 wherein the thyristor means comprises triac means.

12. Circuit according to claim 4 or 5 wherein the first and second thyristors comprise first and second triacs, respectively.

13. A circuit for regulating the RMS value of an AC voltage applied to a load and for decreasing damaging DC current caused by loads having both a resistive and an inductive component comprising:
    (a) only a pair of wires for connection in series with the load and an AC supply voltage;
    (b) a first thyristor having a gate terminal and first and second main terminals, the first main terminal being operatively coupled to one of the pair of wires, a resistor operatively coupling the second main terminal to the other of the pair of wires;
    (c) a second thyristor having a pair of main terminals operatively coupled directly across the pair of wires and a gate terminal operatively coupled to a junction between the resistor and the second main terminal of the first thyristor;
    (d) the first and second thyristors each having a holding current characteristic, the holding current characteristic of the first thyristor being substantially less than the holding characteristic of the second thyristor;
    (e) a control circuit operatively coupled to the gate terminal of the first thyristor and across the pair of wires and comprising a first capacitor and a potentiometer in R-C series combination for selectively firing and rendering conductive the first and second thyristors at firing angles determined at least in part according to the setting of the potentiometer, the second thyristor being fired and rendered conductive when a voltage across the resistor exceeds a selected value, the first thyristor being rendered nonconductive after the second thyristor has been rendered conductive, the RMS value of the AC voltage applied to the load thereby being variable according to the potentiometer setting;

(f) a diac disposed in the circuit and having a breakover voltage, the diac superimposing its breakover voltage upon the R-C series combination of the potentiometer and the first capacitor during periods when the diac is in conduction and adjusting the firing angle to compensate for fluctuations in the AC supply voltage and thereby regulate the RMS value of the AC voltage applied to the load;

(g) a second capacitor in electrical series with the diac for charging to a DC voltage indicative of the magnitude and polarity of a DC current flowing through the load; and (h) means responsive to the DC voltage across the second capacitor to alter the firing angle during selected half cycles of the waveform of the AC voltage applied to the load and thereby decrease the DC current flowing through the load.

14. Circuit according to claim 13 wherein the means responsive to the DC voltage across the second capacitor to alter the firing angle comprises a feedback loop for adding the voltage across the second capacitor to any voltage across the first capacitor.

15. Circuit according to claim 13 wherein the means responsive to the DC voltage across the second capacitor to alter the firing angle comprises means for adding the voltage across the second capacitor to the voltage across the diac to alter the voltage applied to the R-C series combination of the potentiometer and the first capacitor.

16. Circuit according to claim 13 wherein the load is a low voltage transformer.

17. Circuit according to claim 13 wherein the load is a ballast.

18. Circuit according to claims 13, 14, 15, 16 or 17 wherein the first and second thyristors comprise first and second triacs, respectively.

19. A circuit for regulating the RMS value of an Ac voltage applied to a load and for decreasing damaging DC current caused by loads having both a resistive and an inductive component comprising:

(a) only a pair of wires for connection in series with the load and an AC supply voltage;

(b) a first thyristor having a gate terminal and first and second main terminals, the first main terminal being operatively coupled to one of the pair of wires, a resistor operatively coupling the second main terminal to the other of the pair of wires;

(c) a second thyristor having a pair of main terminals operatively coupled directly across the pair of wires and a gate terminal operatively coupled to a junction between the resistor and the second main terminal of the first thyristor;

(d) the first and second thyristors each having a holding current characteristic, the holding current characteristic of the first thyristor being substantially less than the holding characteristic of the second thyristor;

(e) a control circuit operatively coupled to the gate terminal of the first thyristor and across the pair of wires and comprising a first capacitor and a potentiometer in R-C series combination for selectively firing and rendering conductive the first and second thyristors at firing angles determined at least in part according to the setting of the potentiometer, the second thyristor being fired and rendered conductive when a voltage across the resistor exceeds a selected value, the first thyristor being rendered nonconductive after the second thyristor has been rendered conductive, the RMS value of the AC voltage applied to the load thereby being variable according to the potentiometer setting;

(f) a diac disposed in the circuit and having a breakover voltage, the diac superimposing its breakover voltage upon the R-C series combination of the potentiometer and the first capacitor during periods when the diac is in conduction and adjusting the firing angle to compensate for fluctuations in the AC supply voltage and thereby regulate the RMS value of the AC voltage applied to the load;

(g) a second capacitor operatively coupled to the circuit for charging to a DC voltage indicative of the magnitude and polarity of a DC current flowing through the load; and (h) means responsive to the DC voltage across the second capacitor to alter the firing angle during selected half cycles of the waveform of the AC voltage applied to the load and thereby decrease the DC current flowing through the load, said means including means for adding the voltage across the second capacitor to the voltage across the diac to alter the voltage applied to the R-C series combination of the potentiometer and the first capacitor.

20. Circuit according to claim 19, wherein the first and second thyristors comprise first and second triacs, respectively.

* * * * *